Figure 1:
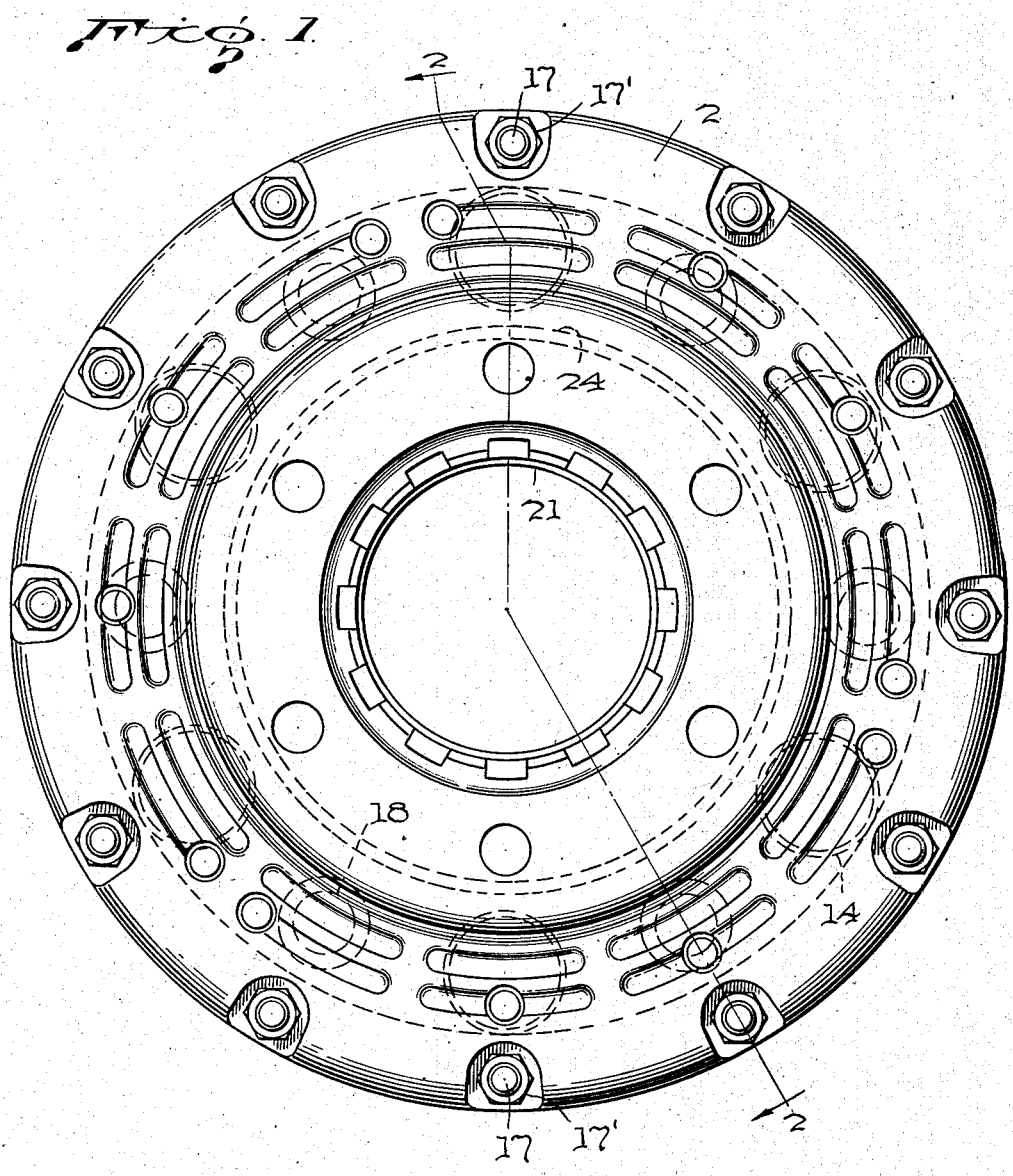

July 10, 1945.  H. T. LAMBERT  2,379,972
ADAPTER BRAKE MECHANISM
Filed June 30, 1944  2 Sheets-Sheet 2
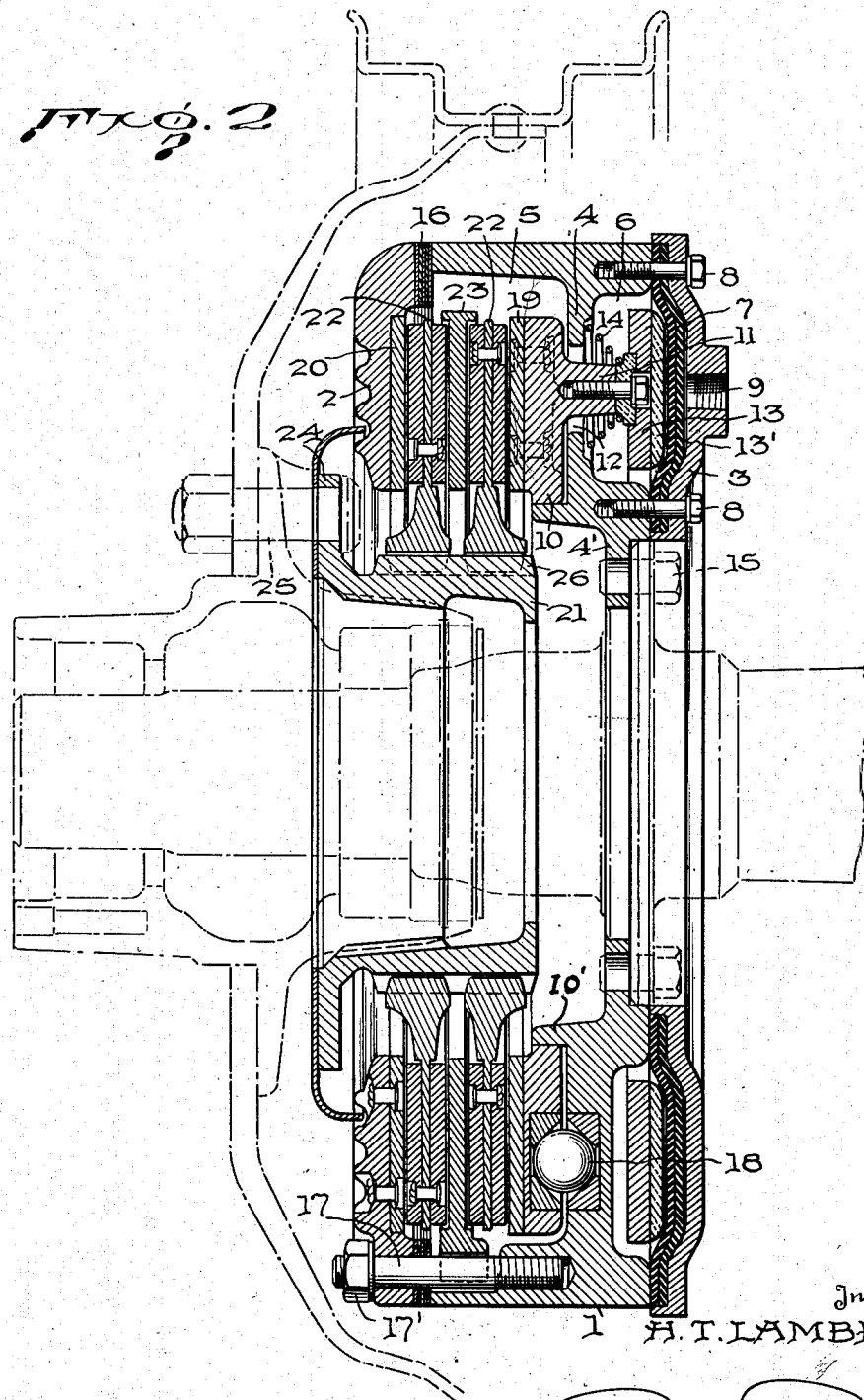
Fig. 2
Inventor
H. T. LAMBERT
By 
Attorneys Patented July 10, 1945

2,379,972

UNITED STATES PATENT OFFICE 2,379,972

ADAPTER BRAKE MECHANISM

Homer T. Lambert, St. Joseph, Mich., assignor to Lambert Brake Corporation, St. Joseph, Mich., a corporation of Michigan Application June 30, 1944, Serial No. 542,933

2 Claims. (Cl. 188—152)

The present invention appertains to improvements in brake mechanisms, particularly of the type disclosed in my co-pending application Serial No. 525,186, now Patent No. 2,368,417, issued January 30, 1945, wherein a flexible diaphragm actuates a primary disc to produce braking action upon a rotating disc connected to the part to be braked.

The present improvements represent developments designed to adapt this type for use where much greater brake action is required, such as in heavy trucks, buses, and other vehicles, without departing materially from the general design of said prior type.

The redesigning of brake constructions to take care of variations in vehicular structures employed for different purposes imposes a heavy expense in time, labor an material in the manufacture of these constructions and, therefore, it is distinctively advantageous to hold as closely to design as possible.

The invention herein is characterized as to novelty by the provision of means for greatly increasing the braking power over that afforded by the brake disclosed in my prior application above referred to, through the provision of an adapter which is connected to the part to be braked (in the instance illustrated, a vehicle wheel) and so constructed as to carry a plurality of rotative and non-rotative friction discs to provide increased friction surfaces, the braking action of which becomes effective upon pressure of such discs between the primary and secondary discs. The use of said adapter thus enables simplification of construction in application to different vehicles, maintenance of general design, and increased efficiency, all of which are important from both a commercial and manufacturing standpoint.

In the drawings:

Figure 1 is a view in elevation of the unit looking at same from the wheel side; and Figure 2 is a sectional view through a brake unit constructed in accordance with my invention taken about on the plane indicated by line 2—2 of Figure 1, and showing in dot-and-dash lines its application to or mounting on a vehicle wheel.

Like reference characters designate corresponding parts in the several figures of the drawings.

Referring particularly to Figure 2, the brake unit comprises a drum-type casing which includes the intermediate body section 1, the end closure plate 2, and the closure plate or ring 3 for the opposite end of the body. The center section 1 is formed with an internal partition or web 4 which divides the casing into two chambers 5 and 6, respectively. In the latter chamber is mounted the flexible diaphragm 7 secured to the center section by outer and inner rows of bolts 8 passing through the cover 3 and diaphragm.

In the cover, an inlet 9 is provided for admittance of the pressure fluid, either liquid or air, and the movements of the diaphragm are transmitted to the primary brake disc 10 mounted on the annular shoulder 10' in the chamber 5 through suitable protuberances 11 projecting laterally through openings 12 in the web 4 and the annular rigid actuating ring 13. Tapering coiled springs 14 seated about the openings 12 and surrounding the protuberances hold the insulating heads or buttons thereof in seating relation to the ring 13 which is provided on its face with a heat-insulating surface 13'.

The inner web flange 4' is secured to the wheel spindle flange by the bolts 15, and the closure cover or secondary disc 2 is clamped in position against adjusting shims 16 by a series of bolts 17 which screw into thickened portions or bosses of the web section 2, as seen at the bottom of Figure 1.

Between the primary disc and the inner face of the web 4 are arranged the energizing or camming discs and balls, generally designated 18. Both the primary and the secondary discs have the friction surfaces 19 and 20, respectively, secured thereon.

The foregoing construction conforms essentially to that of my prior brake of the application referred to herein.

The primary features of the present brake include the adapter unit or sleeve 21, the rotative discs 22, 22, and the intermediate disc 23. The adapter is formed at one end with a mounting flange 24 through which the bolts 25 pass to secure this unit to the vehicle wheel so as to extend the sleeve body into the casing concentric with the spindle or axle housing. At spaced intervals about the outer surface of the sleeve are formed elongated ribs 26, and the rotative discs 22 are each formed at their inner peripheries with conforming transverse slots or key-ways to slidingly receive these ribs.

The intermediate non-rotative friction disc 23 is formed on its outer periphery with a series of notches or slots to interengage with the fastening bolts 17 which secure the cover or secondary disc to the center section 1 of the casing, and, therefore, this disc is held against rotation but is free to move axially with the rotative friction discs 22. It may be added that the discs 22 are each provided with a friction lining material on each of its braking surfaces.

It will be seen from the foregoing description that upon removal of nuts 17' from the bolts 17, the adapter 21, cover 2, and discs 22 and 23 may all be removed as a unit with the wheel, rendering repair, replacement or adjustment of the parts exceedingly simple of attainment. If complete removal of the brake unit is desired, then the displacement of the bolts 15 permits the whole brake unit to be dismounted with the wheel,—an equally simple operation.

The operation of the brake may be simply stated as follows: As air or hydraulic fluid is admitted to the casing, the diaphragm 7 is shifted laterally, actuating the ring 13 and shifting the primary disc into contact with the adjacent rotative disc 22. The primary disc then picks up slight rotary movement and sets up the operation of the auxiliary energizing means 18. As pressure increases, the initial disc 22 contacts intermediate disc 23, causing it to slide into contact with the second rotative disc 22, and finally pressing the latter into frictional engagement with the secondary disc 2 to produce maximum braking effort. As diaphragm pressure is relieved, the springs 14 return the primary disc to normal or disengaged position and all frictional engagement of the brake parts is discontinued.

By the interposition of the non-rotative disc 23 and the use of multiple rotative disc 22, the area of the braking surface is greatly increased and less effort is needed in brake application, and as many of these braking discs, rotative or non-rotative, may be used as desired according to the braking power required. Of course, adapters or casings, or both, of greater capacity or accommodation for the increase in number of discs over that shown herein is involved, but the design of the unit remains the same, from the engineering standpoint.

What I claim is:

1. In brake mechanism for vehicle wheels adapted for mounting on vehicle spindles, the combination of a stationary housing having a partition therein dividing the housing into a disc-receiving chamber at one end and a separate chamber at the other end, means for mounting said housing on the wheel spindle, a primary disc mounted in said disc chamber, an adapter unit connected to the vehicle wheel, a stationary secondary disc in said disc chamber, means for connecting said secondary disc to the housing, spaced rotative discs between the primary and secondary discs operatively connected to the adapter unit for rotation with the wheel, a non-rotative friction disc intermediate the rotative discs and connected with the means for fastening the secondary discs to the housing, and fluid actuating means in said second-mentioned chamber for causing all of said discs to frictionally engage upon brake application.

2. Brake mechanism as set forth in claim 1, wherein the housing unit includes a flexible diaphragm in the separate chamber and an actuating ring in the latter chamber for transmitting its movement to the primary disc and said disc is slightly rotatable when frictionally engaged with a rotatable disc of the adapter unit, together with energizing means coacting with the primary disc and the partition for producing auxiliary brake action upon brake application.

HOMER T. LAMBERT.